(12) United States Patent
Spruce

(10) Patent No.: US 12,221,929 B2
(45) Date of Patent: *Feb. 11, 2025

(54) HIGH POWER EPICYCLIC GEARBOX AND OPERATION THEREOF

(71) Applicant: ROLLS-ROYCE plc, London (GB)

(72) Inventor: Mark Spruce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,580

(22) Filed: Aug. 24, 2023

(65) Prior Publication Data

US 2024/0191660 A1 Jun. 13, 2024

Related U.S. Application Data

(63) Continuation of application No. 17/106,783, filed on Nov. 30, 2020, now Pat. No. 11,781,487.

(30) Foreign Application Priority Data

Dec. 5, 2019 (GB) ...................... 1917782

(51) Int. Cl.
*F02C 7/36* (2006.01)
*B64D 27/10* (2006.01)
(Continued)

(52) U.S. Cl.
CPC ................ *F02C 7/36* (2013.01); *B64D 27/10* (2013.01); *B64D 35/02* (2013.01); *F01D 5/026* (2013.01); *F01D 15/12* (2013.01); *F16C 1/02* (2013.01); *F16C 1/08* (2013.01); *F16C 3/02* (2013.01); *F16H 1/32* (2013.01); *F16H 57/02* (2013.01); *F05D 2220/323* (2013.01); *F05D 2260/40311* (2013.01); *F16C 2202/06* (2013.01);
(Continued)

(58) Field of Classification Search
CPC ............. F02C 7/36; F05D 2260/40311; F05D 2220/323; F16C 2202/06; F16C 2360/23; F16C 2361/65; F16C 1/02; F16C 1/08; F16C 3/02; F16C 2326/43; B64D 35/02; B64D 27/10; F01D 5/12; F01D 5/026; F16H 1/28; F16H 1/32; F16H 57/02; F16H 2057/02039
See application file for complete search history.

(56) References Cited

U.S. PATENT DOCUMENTS 10,436,035 B1 10/2019 Baralon et al.
10,808,626 B1 10/2020 Spruce
(Continued)

*Primary Examiner* — Woody A Lee, Jr.
*Assistant Examiner* — Jesse M Prager
(74) *Attorney, Agent, or Firm* — Oliff PLC

(57) ABSTRACT

A gas turbine engine for an aircraft includes an engine core with a turbine, a compressor, and a core shaft connecting the turbine and compressor; a fan upstream of the engine core including a plurality of fan blades; and a gearbox that receives an input from a gearbox input shaft portion of the core shaft and outputs drive to a fan shaft so as to drive the fan at a lower rotational speed than the core shaft, the gearbox being an epicyclic gearbox including a sun gear, a plurality of planet gears, a ring gear, and a planet carrier arranged to have the plurality of planet gears mounted thereon, and wherein the sun gear receives input from the core shaft. At cruise conditions the product of the torque on the core shaft and radial bending stiffness or tilt stiffness of the gearbox input shaft portion is within a specified range.

20 Claims, 6 Drawing Sheets

(51) Int. Cl.

| | | |
|---|---|---|
| *B64D 35/02* | (2006.01) | |
| *F01D 5/02* | (2006.01) | |
| *F01D 15/12* | (2006.01) | |
| *F16C 1/02* | (2006.01) | |
| *F16C 1/08* | (2006.01) | |
| *F16C 3/02* | (2006.01) | |
| *F16H 1/28* | (2006.01) | |
| *F16H 1/32* | (2006.01) | |
| *F16H 57/02* | (2012.01) | |

(52) U.S. Cl.
CPC ...... *F16C 2326/43* (2013.01); *F16C 2360/23* (2013.01); *F16C 2361/65* (2013.01); *F16H 1/28* (2013.01); *F16H 2001/327* (2013.01); *F16H 2057/02039* (2013.01)

(56) References Cited

U.S. PATENT DOCUMENTS

| | | |
|---|---|---|
| 10,830,154 B1 | 11/2020 | Spruce |
| 10,837,370 B1 | 11/2020 | Spruce |
| 10,851,715 B1 | 12/2020 | Spruce |
| 10,859,001 B1 | 12/2020 | Spruce |
| 10,961,918 B1 | 3/2021 | Spruce |
| 11,022,044 B1 | 6/2021 | Spruce |
| 11,408,354 B2 | 8/2022 | Spruce |
| 2013/0336791 A1 | 12/2013 | McCune et al. |
| 2016/0097331 A1 | 4/2016 | Venter et al. |
| 2017/0261096 A1 | 9/2017 | Bradley et al. |
| 2017/0342858 A1 | 11/2017 | McCune et al. |
| 2018/0274443 A1 | 9/2018 | Pointon et al. |
| 2019/0249720 A1 | 8/2019 | Maguire |
| 2019/0271267 A1 | 9/2019 | Husband et al. |
| 2019/0284954 A1 | 9/2019 | Doesburg |
| 2019/0316488 A1 | 10/2019 | Menczykalski et al. |

HIGH POWER EPICYCLIC GEARBOX AND OPERATION THEREOF

RELATED APPLICATIONS

This application is a continuation application of U.S. patent application Ser. No. 17/106,783, filed Nov. 30, 2020, which claims priority to British Patent Application No. GB 1917782.3, filed Dec. 5, 2019. Those prior applications are incorporated by reference herein in their entireties.

BACKGROUND

The present disclosure relates to gearboxes for aircraft engines, to geared gas turbine engines and other such propulsors for use in aircraft, and to methods of operating such an aircraft. Such gearboxes may be epicyclic gearboxes wherein the input shaft to the gearbox has the sun gear of the gearbox mounted thereon, and the input shaft stiffness and torque levels at cruise meet specified criteria.

SUMMARY

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance extending in a radial direction in a radial plane, or extending in an axial direction in an axial plane, respectively.

According to a first aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon, and wherein the sun gear receives the input from the core shaft. At cruise conditions:
the torque on the core shaft is greater than 10,000 Nm; and
a first sun input shaft ratio of:

$$\frac{\text{the tilt stiffness of the gearbox input shaft}}{\text{the torque on the core shaft}}$$

is greater than or equal to 4 rad$^{-1}$.
The first sun input shaft ratio may be greater than or equal to 5 rad$^{-1}$.
The first sun input shaft ratio may be less than or equal to 150 rad$^{-1}$.
The tilt stiffness of the gearbox input shaft may be greater than or equal to 5×10$^4$ Nm/radian.
The tilt stiffness of the gearbox input shaft may be less than or equal to 5×10$^6$ Nm/radian.

The radial bending stiffness of the gearbox input shaft may be greater than or equal to 6×10$^5$ N/m (and optionally greater than or equal to 6.00×10$^5$ N/m). The radial bending stiffness of the gearbox input shaft may be less than or equal to 3×10$^7$ N/m (and optionally less than or equal to 3.00×10$^7$ N/m).

The product of the tilt stiffness of the gearbox input shaft and the torque on the core shaft at cruise may be equal to or greater than 5.5×10$^8$, and optionally less than 2.0×10$^{11}$ N$^2$ m$^{-2}$/radian.

The product of the tilt stiffness of the gearbox input shaft and the torque on the core shaft may be equal to or greater than 6.0×10$^8$, and optionally less than 9.0×10$^{10}$ N$^2$ m$^{-2}$/radian.

A second sun input shaft ratio of:

$$\frac{\text{the radial bending stiffness of the gearbox input shaft}}{\text{the torque on the core shaft at cruise}}$$

may be greater than or equal to 7 m$^{-2}$ (torque at cruise conditions), and optionally less than 800 m$^{-2}$.

The product of the radial bending stiffness of the gearbox input shaft and the torque on the core shaft at cruise, may be greater than or equal to 1.2×10$^9$ N$^2$, and optionally less than 8.0×10$^{11}$ N$^2$.

According to a second aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon, and wherein the sun gear receives the input from the core shaft. At cruise conditions:
the torque on the core shaft is greater than 10,000 Nm; and
a second sun input shaft ratio of $$\frac{\text{the radial bending stiffness of the gearbox input shaft}}{\text{the torque on the core shaft}}$$

is greater than or equal to 7 m$^{-2}$.
The second sun input shaft ratio may be less than or equal to 800 m$^{-2}$.
The second sun input shaft ratio may be greater than or equal to 14 m$^{-2}$ or 35 m$^{-2}$.
The second sun input shaft ratio may be less than or equal to 400 m$^{-2}$ or 100 m$^{-2}$.
The radial bending stiffness of the gearbox input shaft may be greater than or equal to 6×10$^5$ N/m, and optionally less than or equal to 3×10$^7$ N/m.
The tilt stiffness of the gearbox input shaft may be greater than or equal to 5×10$^4$ Nm/radian, and optionally less than or equal to 5×10$^6$ Nm/radian.
A first sun input shaft ratio of:

$$\frac{\text{the tilt stiffness of the gearbox input shaft}}{\text{the torque on the core shaft}}$$

may be greater than or equal to 4 rad$^{-1}$, and optionally less than or equal to 150 rad$^{-1}$.

The product of the radial bending stiffness of the gearbox input shaft and the torque on the core shaft at cruise, may be greater than or equal to $1.2 \times 10^9$ N$^2$, and optionally less than $8.0 \times 10^{11}$ N$^2$, and further optionally may be equal to or greater than $2.4 \times 10^9$ N$^2$, and optionally less than $4.0 \times 10^{11}$ N$^2$.

In either or both of the preceding aspects:
(i) the gearbox may be a star gearbox and the change in torque, $\Delta\tau$, between the core shaft and the fan shaft may be:

$$\Delta\tau = \left(1 + \frac{1}{\text{star gearbox gear ratio}}\right) \times \text{torque on the fan shaft};$$

(ii) the gearbox may be a planetary gearbox and the change in torque, $\Delta\tau$, between the core shaft and the fan shaft may be:

$$\Delta\tau = \left(1 - \frac{1}{\text{planetary gearbox gear ratio}}\right) \times \text{torque on the fan shaft}.$$

A gear ratio of the gearbox may be in any range disclosed herein, and for example may be in the range from 3.2 to 4.5, and optionally from 3.3 to 4.0.

A specific thrust of the engine at cruise conditions may be in any range disclosed herein, and for example may be in the range from 70 to 90 NKg$^{-1}$s.

A bypass ratio at cruise may be in any range disclosed herein, and for example may be in the range from 12.5 to 18; and optionally from 13 to 16.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The gearbox input shaft may provide a soft mounting for the sun gear such that some movement of the sun gear is facilitated. The core shaft may comprise a more stiff section and a less stiff section, the less stiff section providing the gearbox input shaft and being arranged to lie between the more stiff section and the sun gear, the less stiff section being arranged to provide, or to contribute to, the soft mounting of the sun gear.

The fan may have a fan diameter greater than 240 cm and less than or equal to 380 cm, and optionally greater than 300 cm and less than or equal to 380 cm.

According to a third aspect, there is provided a method of operating an aircraft comprising an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon, and wherein the sun gear receives the input from the core shaft. The method comprises controlling the aircraft such that the torque on the core shaft under cruise conditions is greater than 10,000 Nm; and a first sun input shaft ratio of:

$$\frac{\text{the tilt stiffness of the gearbox input shaft}}{\text{the torque on the core shaft under cruise conditions}}$$

is greater than or equal to 4 rad$^{-1}$.

The first sun input shaft ratio may be less than or equal to 150 rad$^{-1}$.

The ratios and parameters may have values in ranges as discussed for the first and second aspects.

According to a fourth aspect, there is provided method of operating an aircraft comprising: an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon, and wherein the sun gear receives the input from the core shaft. The method comprises controlling the aircraft such that the torque on the core shaft under cruise conditions is greater than 10,000 Nm; and a second sun input shaft ratio of:

$$\frac{\text{the radial bending stiffness of the gearbox input shaft}}{\text{the torque on the core shaft under cruise conditions}}$$

is greater than or equal to 7 m$^{-2}$.

The second sun input shaft ratio may be less than or equal to 800 m$^{-2}$.

The ratios and parameters may have values in ranges as discussed for the first and second aspects.

The method of the third and/or fourth aspect may comprise driving the gearbox with an input torque (i.e. torque on the core shaft) of:
(i) greater than or equal to 11,000 Nm at cruise; and/or
(ii) greater than or equal to 28,000 Nm at MTO.

According to a fifth aspect, there is provided a propulsor for an aircraft comprising: a fan comprising a plurality of fan blades; a gearbox; and a power unit for driving the fan via the gearbox. The gearbox is an epicyclic gearbox arranged to receive an input from a gearbox input shaft portion of a core shaft driven by the power unit and to output drive to the fan so as to drive the fan at a lower rotational speed than the core shaft, and comprises: a sun gear, a plurality of planet gears, a ring gear, and a planet carrier on which the planet gears are mounted. At cruise conditions:
the torque on the core shaft is greater than 10,000 Nm; and
a first sun input shaft ratio of:

$$\frac{\text{the tilt stiffness of the gearbox input shaft}}{\text{the torque on the core shaft}}$$

is greater than or equal to 4 rad$^{-1}$.

The first sun input shaft ratio may be less than or equal to 150 rad$^{-1}$ The ratios and parameters may have values in ranges as discussed for the first and second aspects.

According to a sixth aspect, there is provided a propulsor for an aircraft comprising: a fan comprising a plurality of fan blades; a gearbox; and a power unit for driving the fan via the gearbox. The gearbox is an epicyclic gearbox arranged to receive an input from a gearbox input shaft portion of a core shaft driven by the power unit and to output drive to the fan so as to drive the fan at a lower rotational speed than the core shaft, and comprises: a sun gear, a plurality of planet gears, a ring gear, and a planet carrier on which the planet gears are mounted. At cruise conditions, the torque on the core shaft is greater than 10,000 Nm; and a second sun input shaft ratio of:

$$\frac{\text{the radial bending stiffness of the gearbox input shaft}}{\text{the torque on the core shaft}}$$

is greater than or equal to $7\ m^{-2}$.

The second sun input shaft ratio may be less than or equal to $800\ m^{-2}$.

The ratios and parameters may have values in ranges as discussed for the first and second aspects.

The inventor has discovered that maintaining at least one of the tilt stiffness and the radial bending stiffness of the gearbox input shaft in the specified range as compared to the torque allows for some isolation of the gearbox, protecting it from excessive loads, whilst still maintaining deflections of the shaft within acceptable levels for engine functioning.

The radial bending and/or tilt stiffness of the gearbox input shaft, which may also be referred to as a portion of the core shaft, is therefore arranged to be lower than that for conventional engines. In various embodiments, the radial bending and/or tilt stiffness of the gearbox input shaft may be lower relative to the torque than the radial bending and/or tilt stiffness of the gearbox input shaft of a conventional engine by a factor of greater than or equal to 2, greater than or equal to 5, or greater than or equal to 10. The inventor appreciated that having a relatively low stiffness as compared to the torque at cruise may facilitate maintaining gearbox isolation.

Further, the inventor discovered that the shaft tilt stiffness may have a more significant effect than the shaft radial bending stiffness—excess tilt deflections of the shaft may be more damaging than radial bending deflections for the same magnitude of deflection as tilt deflections may produce two compounding effects—firstly, load share may worsen, with some planet gears taking a larger share of the load from the sun gear mounted on the shaft than others, and secondly face distribution of that load shifts. The larger force on a particular planet gear is therefore concentrated on one side of the gear rather than equally distributed across the tooth. The increased load on that gear and the increased concentration of that load may therefore damage the gear teeth. Maintaining the shaft tilt stiffness above $5 \times 10^4$ Nm/rad, and optionally above $6.5 \times 10^4$ Nm/rad or $1.0 \times 10^5$ Nm/rad may therefore be of particular importance in some embodiments.

One or more shaft properties such as shaft diameter, material(s), and wall thickness may be adjusted so as to obtain shaft stiffnesses in the desired ranges.

"Cruise conditions" may be as defined elsewhere herein; for example corresponding to atmospheric conditions at an altitude that is in the range of from 10500 m to 11600 m, and optionally to atmospheric conditions at an altitude of 11000 m. A forward speed of the gas turbine engine at cruise conditions may be in the range of from Mach number (Mn) 0.75 to Mn 0.85. A forward speed of the gas turbine engine at the cruise conditions may be Mn 0.8.

Cruise conditions may correspond to:
a forward Mach number of 0.8;
a pressure of 23000 Pa; and
a temperature of −55 deg. C.

In various other aspects, the specified boundaries on the first sun input shaft ratio may be replaced by, or provided in addition to, specified boundaries on the product of the components of the first sun input shaft ratio, i.e. boundaries on the tilt stiffness of the gearbox input shaft multiplied by the torque on the core shaft. The value of this product, in various aspects, may be greater than or equal to $5.5 \times 10^8\ N^2\ m^{-2}\ rad^{-1}$, and optionally less than $2.0 \times 10^{11}\ N^2\ m^{-2}\ rad^{-1}$, and further optionally may be greater than or equal to $6.0 \times 10^8\ N^2\ m^{-2}\ rad^{-1}$, and optionally less than $9.0 \times 10^{10}\ N^2\ m^{-2}\ rad^{-1}$.

For example, according to a seventh aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to a fan shaft so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon, and wherein the sun gear receives the input from the core shaft. At cruise conditions:
the torque on the core shaft is greater than 10,000 Nm; and
a first sun input shaft product of:
the tilt stiffness of the gearbox input shaft×the torque on the core shaft is greater than or equal to $5.5 \times 10^8\ N^2\ m^{-2}\ rad^{-1}$.

The skilled person would appreciate that method and propulsor aspects may be formulated accordingly.

The optional features of the aspects for the corresponding ratio may also apply to these aspects.

In various other aspects, the specified boundaries on the second sun input shaft ratio may be replaced by, or provided in addition to, specified boundaries on the product of the components of the second sun input shaft ratio, i.e. boundaries on the radial bending stiffness of the gearbox input shaft multiplied by the torque on the core shaft. The value of this product, in various aspects, may be greater than or equal to $1.2 \times 10^9\ N^2$, and optionally less than $8.0 \times 10^{11}\ N^2$, and further optionally may be greater than or equal to $2.4 \times 10^9\ N^2$, and optionally less than $4.0 \times 10^{11}\ N^2$.

For example, according to an eighth aspect, there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from a gearbox input shaft portion of the core shaft and outputs drive to the fan so as to drive the fan at a lower rotational speed than the core shaft, the gearbox being an epicyclic gearbox comprising a sun gear, a plurality of planet gears, a ring gear, and a planet carrier arranged to have the plurality of planet gears mounted thereon, and wherein the sun gear receives the input from the core shaft. At cruise conditions:
the torque on the core shaft is greater than 10,000 Nm; and
a second sun input shaft product of:
the radial bending stiffness of the gearbox input shaft×the torque on the core shaft is greater than or equal to $1.2 \times 10^9\ N^2$.

The skilled person would appreciate that method and propulsor aspects may be formulated accordingly.

The optional features of the aspects for the corresponding ratio may also apply to these aspects.

For any parameter or ratio of parameters X claimed or disclosed herein, a limit on the values that X can take that is expressed as "X is greater than or equal to Y" can alternatively be expressed as "1/X is less than or equal to 1/Y". Any of the ratios or parameters defined in the aspects and statements above may therefore be expressed as "1/X is less than or equal to 1/Y" rather than "X is greater than or equal to Y". Zero may be taken as the lower bound on the value of 1/X.

Various parameters of the gearbox, and/or of the engine more generally, may be adjusted to allow the engine to meet the specifications of the aspects summarised above. Comments on various such parameters are provided below.

The inventor appreciated that too high a gearbox input shaft radial bending stiffness may reduce or prevent gearbox isolation—allowing some flexibility may reduce or avoid the transmission of damaging loads into the gearbox. However, the inventor also appreciated that too low a radial bending stiffness may allow vibrations at low modal frequencies, with larger amplitudes/deflections than the higher modes, to arise, and/or may allow excessive displacement of the shaft, creating mis-alignment in the gears and bearings within the gearbox. The inventor discovered that controlling the gearbox input shaft radial bending stiffness with respect to the torque on the shaft to be within the range detailed above may provide gearbox isolation without excessive vibrations or displacements. The inventor discovered that a similar relationship applies to tilt stiffness of the gearbox input shaft.

The inventor discovered that the torsional stiffness of the gearbox input shaft has an effect on the torsional stiffness of the whole transmission, but a relatively minimal effect on gearbox operation as torsional deflection results in wind up only, and no misalignment of gears. The gearbox input shaft may therefore have a lower torsional stiffness than the carrier without deleterious effects.

The inventor realised that decreasing the torsional stiffnesses of the shaft below the ranges defined herein may result in deleterious torsion vibrations at low modal frequencies (the skilled person would appreciate that the lower modal frequency whirl modes have larger amplitudes/deflections than the higher modes, and so are more important to avoid), whilst increasing the torsional stiffness above the ranges defined herein may result in excessive size and/or weight of the shaft without a corresponding improvement in performance.

One or more of shaft diameter, material(s), and wall thickness may be adjusted so as to obtain a gearbox input shaft torsional stiffness in a desired range. The skilled person would appreciate that a larger diameter generally increases shaft stiffness, but that the shaft may buckle if too thin-walled.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust (for example maximum throttle) for the engine at International Standard Atmosphere (ISA) sea level pressure and temperature+15° C. with a fan inlet velocity of 0.25 Mn.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

Whilst in the arrangements described herein the source of drive for the propulsive fan is provided by a gas turbine engine, the skilled person will appreciate the applicability of the gearbox configurations disclosed herein to other forms of aircraft propulsor comprising alternative drive types. For example, the above-mentioned gearbox arrangements may be utilised in aircraft propulsors comprising a propulsive fan driven by an electric motor. In such circumstances, the electric motor may be configured to operate at higher rotational speeds and thus may have a lower rotor diameter and may be more power-dense. The gearbox configurations of the aforesaid aspects may be employed to reduce the rotational input speed for the fan or propeller to allow it to operate in a more favourable efficiency regime. Thus, according to an aspect, there is provided an electric propulsion unit for an aircraft, comprising an electric machine configured to drive a propulsive fan via a gearbox, the gearbox and/or its inputs/outputs/supports being as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which:

DETAILED DESCRIPTION OF EMBODIMENTS

Figure 1:
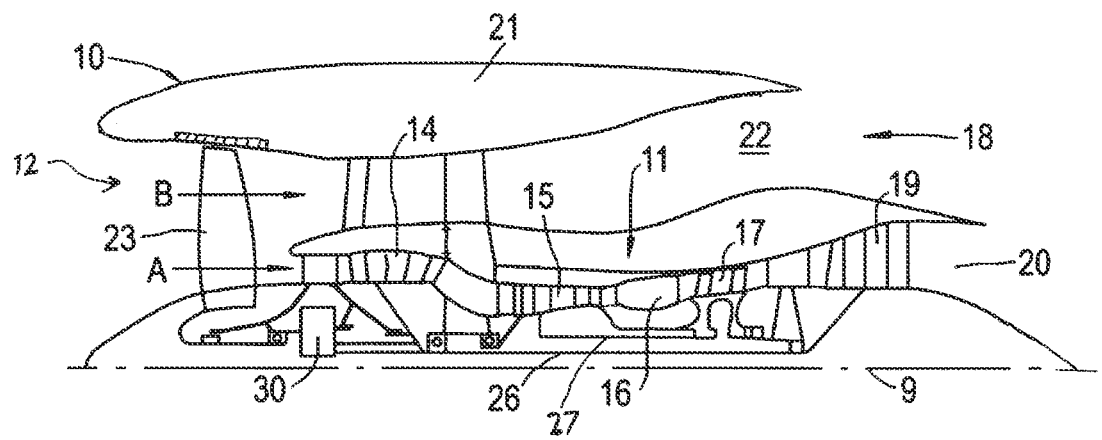
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
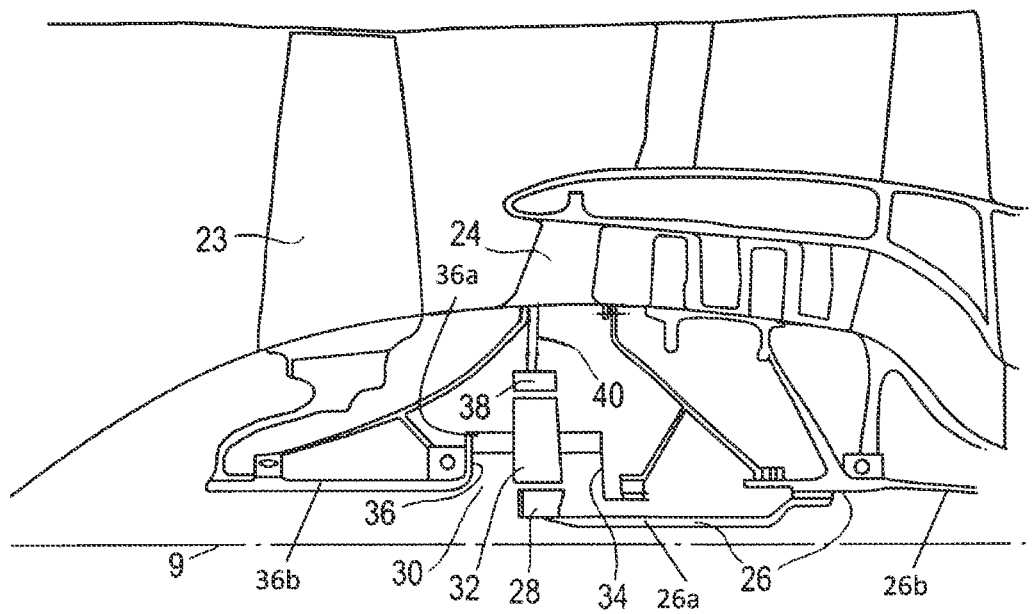
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The linkages 36 may be referred to as a fan shaft 36, the fan shaft 36 optionally comprising two or more shaft portions 36a, 36b coupled together. For example, the fan shaft 36 may comprise a gearbox output shaft portion 36a extending from the gearbox 30 and a fan portion 36b extending between the gearbox output shaft portion and the fan 23. In the embodiment shown in FIGS. 1 and 2, the gearbox 30 is a planetary gearbox and the gearbox output shaft portion 36a may be integral with, or connected to, the planet carrier 34—it may therefore be referred to as a carrier output shaft 36a. In star gearboxes 30, the gearbox output shaft portion 36a may be integral with, or connected to, the ring gear 38—it may therefore be referred to as a ring output shaft 36a. In the embodiment shown in FIGS. 1 and 2, the fan portion 36b of the fan shaft 36 connects the gearbox output shaft portion 36a to the fan 23. The output of the gearbox 30 is therefore transferred to the fan 23, to rotate the fan, via the fan shaft 36. In alternative embodiments, the fan shaft 36 may comprise a single component, or more than two components. Unless otherwise indicated or apparent to the skilled person, anything described with respect to an engine 10 with a star gearbox 30 may equally be applied to an engine with a planetary gearbox 30, and vice versa.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
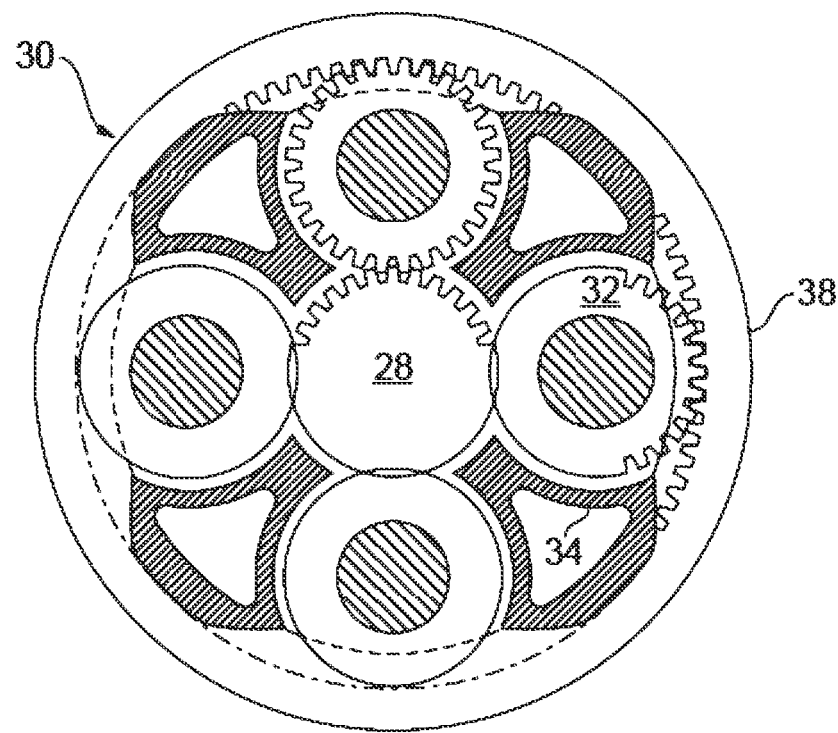
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The following general definitions may be used herein:
Radial Bending Stiffness

Figure 4:
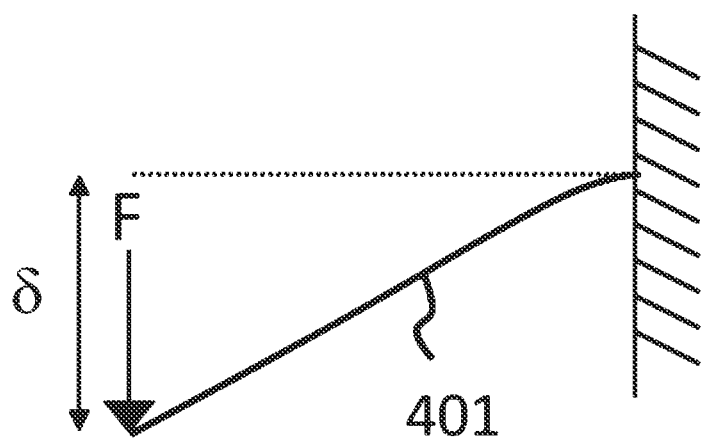
FIG. 4 is a schematic diagram illustrating radial bending stiffness of a cantilevered beam.

A radial bending stiffness is a measure of deformation for a given force applied in any one selected radial direction (i.e. any direction perpendicular to and passing through the engine axis). The radial bending stiffness is defined with reference to FIG. 4 in terms of the deformation of a cantilevered beam 401. As illustrated in FIG. 4, a force, F, applied at the free end of the beam in a direction perpendicular to the longitudinal axis of the beam causes a linear perpendicular deformation, δ. The radial bending stiffness is the force applied for a given linear deformation i.e. F/δ. In the present application, the radial bending stiffness is taken relative to the rotational axis of the engine 9, and so relates to the resistance to linear deformation in a radial direction of the engine caused by a radial force. The beam, or equivalent cantilevered component, extends along the axis of rotation of the engine, the force, F, is applied perpendicular to the axis of rotation of the engine, along any radial direction, and the displacement, δ, is measured perpendicular to the axis of rotation 9, along the line of action of the force. The radial bending stiffness as defined herein has SI units of N/m. In the present application, unless otherwise stated, the radial bending stiffness is taken to be a free-body stiffness i.e. stiffness measured for a component in isolation in a cantilever configuration, without other components present which may affect its displacement.

When the force is applied perpendicular to the cantilevered beam, and at the free end of the beam, the resultant curvature is not constant but rather increases towards the fixed end of the beam.

Tilt Stiffness

Figure 5:
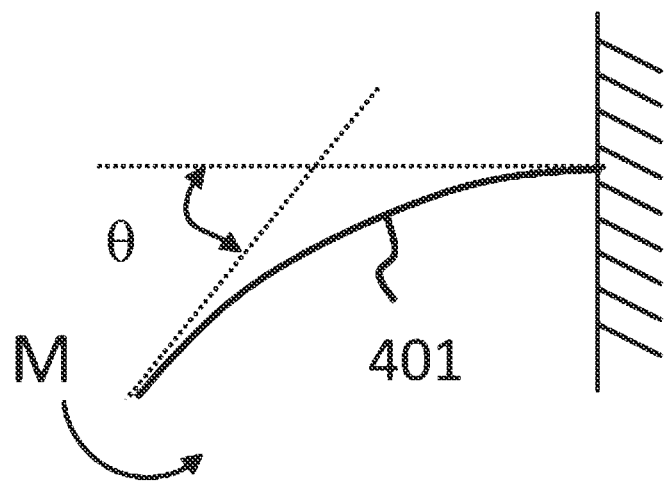
FIG. 5 is a schematic diagram illustrating tilt stiffness of a cantilevered beam.

A tilt stiffness is defined with reference to FIG. 5, which shows the resulting deformation of a cantilevered beam 401 under a moment M applied at its free end. The tilt stiffness is a measure of the resistance to rotation of a point on the component at which a moment is applied. As can be seen in FIG. 5, an applied moment at the free end of the cantilevered beam causes a constant curvature along the length of the beam between its free and fixed ends. The applied moment M causes a rotation θ of the point at which it is applied. The tilt stiffness as defined herein therefore has SI units of Nm/rad.

Torsional Stiffness

Figure 6:
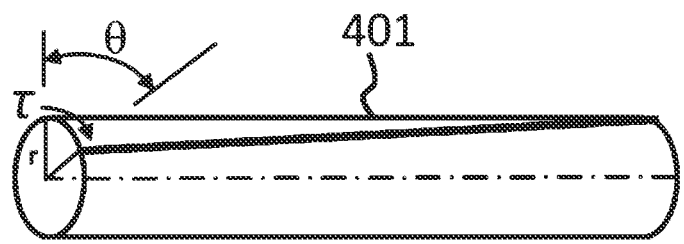
FIG. 6 is a schematic diagram illustrating the application of a torque to a shaft.

FIG. 6 illustrates the definition of the torsional stiffness of a shaft 401 or other body. A torque, τ, applied to the free end of the beam causes a rotational deformation, θ (e.g. twist) along the length of the beam. The torsional stiffness is the torque applied for a given angle of twist i.e. τ/θ. The torsional stiffness has SI units of Nm/rad.

An effective linear torsional stiffness may be determined for a component having a given radius. The effective linear torsional stiffness is defined in terms of an equivalent tangential force applied at a point on that radius (with magnitude of torque divided by the radius) and the distance δ (with magnitude of the radius multiplied by θ) moved by a point corresponding to the rotational deformation θ of the component.

Torque

Torque, which may also be referred to as moment, is the rotational equivalent of linear force, and can be thought of as a twist to an object. FIG. 6 illustrates the application of a torque to a shaft. If the shaft is able to rotate freely, the torque will cause rotation of the shaft. If the shaft is held in place at one end, the shaft will wind up/twist, as shown in FIG. 6—one end of the shaft may rotate by an angle θ as compared to the other end. If the shaft can rotate against a load, a combination of wind-up and rotation may result from the application of the torque, with the torsional stiffness of the shaft affecting the amount of wind-up.

The magnitude, τ, of torque, τ, of a body depends on three quantities: the force applied (F), the lever arm vector connecting the origin to the point of force application (r), and the angle (A) between the force and lever arm vectors:

$$\tau = r \times F$$

$$\tau = |\tau| = |r \times F| = |r||F|\sin A$$

where: τ is the torque vector and τ is the magnitude of the torque;
r is the position vector or "lever arm" vector (a vector from the selected point on the body to the point where the force is applied);
F is the force vector;
x denotes the cross product; and
A is the angle between the force vector and the lever arm vector (sin(A) is therefore one when the force vector is perpendicular to the position vector, such that τ=rF, i.e. magnitude of the force multiplied by distance between the selected point on the body and the point of application of the force).

Torque has units of [force]×[distance] and may be expressed in units of Newton metres (N·m). The net torque on a body determines the rate of change of the body's angular momentum.

Gear Ratios

For a pair of gears, the gear ratio is the ratio of the number of rotations of a driven gear to the number of rotations of a driver gear—the ratio of numbers of teeth of the driven gear and driver gear correspond to the number of rotations of one gear for one rotation of the other gear.

More generally:

$$\text{gear ratio} = \frac{\text{rotation speed of driven gear}}{\text{rotation speed of driver gear}}$$

In the field of aerospace power gearboxes, the gearbox 30 is generally a reduction gearbox (i.e. the output rotational speed is lower than the input rotational speed). The gear ratio as defined above is therefore less than one, as the rotation speed of the driven gear is lower than that of the driver gear (e.g. a driven:driver ratio of 1:3 is a gear ratio of 1/3 for an example gearbox). In the field, the reduction ratio of the gearbox (the inverse of the gearbox ratio) is often referred to as the gearbox ratio for simplicity of numbers (so the example gearbox may be listed as having a gear ratio of 3 instead of 1/3; the skilled person would appreciate that a "gear ratio" greater than one would more accurately be referred to as a reduction ratio.

In an epicyclic gearbox 30, such as that shown in FIG. 3, a sun gear 28 drives planet gears 32.

The epicyclic gearbox 30 illustrated by way of example in FIGS. 2 and 3 is of the planetary type, in that the planet carrier 34 rotates, and is coupled to an output shaft via linkages 36, with the ring gear 38 fixed. The planet gears 32 therefore move around ("orbit") the sun gear 28, carried by the planet carrier 34, as well as rotating about their own axes. In this example, the sun gear 28 is the input gear.

For planetary gearboxes of this type, the gear ratio is:

$$i_{planetary} = \frac{\omega_{carrier}}{\omega_{sun}} = \frac{1}{1 + \frac{Z_R}{Z_S}}$$

where $Z_R$ is the number of teeth on the ring gear 38 and $Z_S$ is the number of teeth on the sun gear 28. This may also be written as a gear ratio of 1:

$$1 + \frac{Z_R}{Z_S}.$$

In a planetary gearbox 30, the input and output shafts rotate in the same direction. For planetary gearboxes of various embodiments the gear ratio (reduction ratio) may be greater than or equal to 3.6 (1:3.6), and optionally may be greater than or equal to 4 (1:4).

In other embodiments, the epicyclic gearbox 30 may have a star arrangement, in which the planet carrier 34 is held fixed, such that the planet gears 32 rotate in place but do not orbit the sun gear 28 with the ring (or annulus) gear 38 allowed to rotate. In such an arrangement the fan 23 is driven by the rotating ring gear 38. In this example, the ring gear 38 is the output (driven) gear and the sun gear 28 is again the input (driver) gear. In a star gearbox 30, the input and output shafts rotate in opposite directions.

For star gearboxes, the gear ratio is:

$$i_{star} = \frac{\#\text{teeth driven}}{\#\text{teeth driver}} = \frac{\#\text{teeth on ring gear}}{\#\text{teeth on sun gear}} = \frac{Z_R}{Z_S}$$

For star gearboxes of various embodiments the gear ratio (reduction ratio) may be less than or equal to 3.6 (1:3.6), and optionally may be greater than or equal to 3 (1:3). The gear ratio may be between 1:3 and 1:3.3 in various embodiments. The gear ratio of star gearboxes 30 may generally be lower than the gear ratio of planetary gearboxes 30.

The gear ratio defines the ratio between the torque input to the gearbox 30 (via the sun input shaft, or core shaft, 26, in the embodiments being described) and the torque output from the gearbox 30 (via the fan shaft 36, extending from the carrier 34, in the embodiments being described):

$$\text{Gear ratio} = \frac{\text{output torque}}{\text{input torque}}$$

For a star gearbox:

$$i_{star} = -\frac{Z_R}{Z_S} = \frac{\text{output torque}}{\text{input torque}}$$

$$\text{output torque} = -\frac{Z_R}{Z_S}\text{input torque}$$

The minus sign arises from the direction change of the torque. The change in torque across the gearbox is therefore by a factor of $$1 + \frac{Z_R}{Z_S}$$

(i.e. 1 plus the gear ratio), due to the reversal of direction. The change in torque across the gearbox is therefore by a factor of more than one, as $z_R/z_S$ is positive. The change in torque, $\Delta\tau$, between the core shaft 26 and the fan shaft 36 for a star gearbox may therefore be shown as:

$$\Delta\tau = (1 + \text{gearbox gear ratio}) \times \text{torque on the fan shaft}$$

For a planetary gearbox:

$$i_{planetary} = \frac{1}{1 + \frac{Z_R}{Z_S}} = \frac{\text{output torque}}{\text{input torque}}$$

$$\text{output torque} = \frac{1}{1 + \frac{Z_R}{Z_S}}\text{input torque}$$

The change in torque across the gearbox is therefore by a factor of $$1 - \frac{1}{1 + \frac{Z_R}{Z_S}}$$

(i.e. 1 minus the gear ratio). The change in torque across the gearbox is therefore by a positive factor of less than 1, as $z_R/z_S$ is positive, so $$1 + \frac{Z_R}{Z_S} > 1.$$

The change in torque, $\Delta\tau$, between the core shaft 26 and the fan shaft 36 for a planetary gearbox may therefore be shown as:

$$\Delta\tau = (1 - \text{gearbox gear ratio}) \times \text{torque on the fan shaft}$$

More specific definitions of stiffnesses and torques relating to embodiments described herein are provided below for ease of understanding.

Gearbox Input Shaft Stiffnesses

In the arrangement shown in FIGS. 1 and 2, the gearbox input shaft 26a (a portion of the core shaft 26) drives the sun gear 28. The gearbox input shaft 26a may therefore be referred to as a sun input shaft 26a. The gearbox input shaft 26a may be a sun input shaft 26a in star arrangements (as well as planetary). The gearbox input shaft 26a may also be referred to as a part of the core shaft 26—a forward portion 26a of the core shaft 26 which provides the input to the gearbox 30.

The core shaft 26 therefore comprises a gearbox input shaft 26a, which rotates with the rest of the core shaft 26 but may have a different stiffness from the rest of the core shaft. In the arrangement being described with respect to FIGS. 1 and 2, the core shaft 26 extends between the turbine 19 and the gearbox 30, connecting the turbine 19 to the compressor 14, and the turbine and compressor to the gearbox 30. A rearward portion 26b of the core shaft 26 (the turbine shaft 26b) extends between the turbine 19 and the compressor 14, connecting the turbine to the compressor. A forward portion 26a of the core shaft 26 (the gearbox input shaft 26a) extends between the compressor 14 and the gearbox, connecting the turbine and compressor to the gearbox 30. As this forward portion 26a provides the torque to the gearbox 30, it is referred to as the gearbox input shaft 26a. In the described arrangement, a bearing 26c is present on the core shaft 26 at or near the axial position at which the rearward portion 26b meets the gearbox input shaft 26a.

In some gearboxes 30, the planet carrier 34 may be driven by the gearbox input shaft 26a, for example—in such embodiments, the gearbox input shaft 26a may not be a sun input shaft 26a. However, this may make mounting of the sun gear 28 more difficult.

Figure 7:
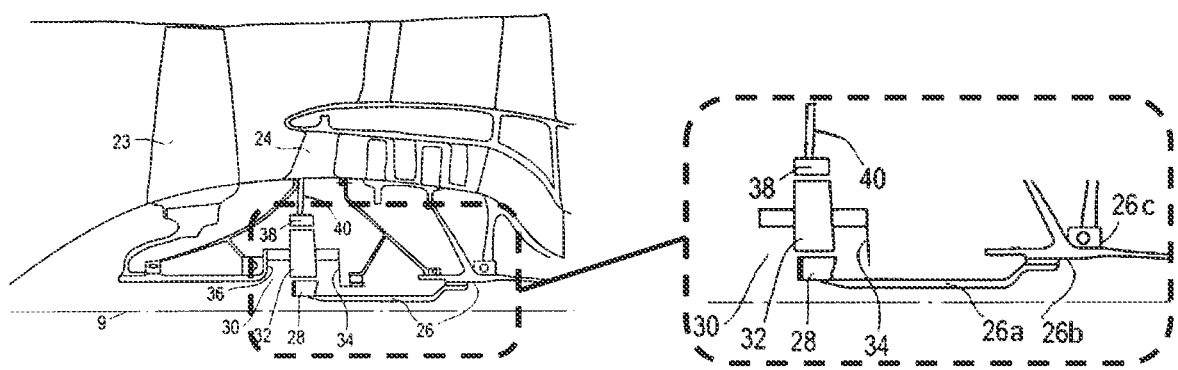
FIG. 7 is a sectional side view and close-up view illustrating the core shaft, and in particular the gearbox input shaft.

In the arrangement being described, the core shaft 26 is divided into two sections as shown in FIG. 7; a first section 26a extending from the gearbox 30 and connected to the sun gear 28 (the gearbox input shaft 26a), and a second section 26b extending rearwardly from the first section and connected to the turbine 19 (the turbine shaft 26b).

In the described arrangement, the first section 26a is designed to have a lower stiffness than the second section 26b—this may provide a soft mounting for the sun gear 28 whilst maintaining rigidity elsewhere in the engine 10. In such arrangements, the second section 26b is designed to be effectively rigid (as compared to the stiffness of the first section 26a). The second section 26b connecting the turbine and the compressor and the gearbox 30 may be referred to as the turbine shaft 26b. The turbine shaft 26b is arranged to transmit the torsional loads to drive the compressor and the gearbox 30, as well as the compressor and turbine axial loads.

In alternative embodiments, the core shaft 26 may not be divided into sections of different stiffness, and may instead have a constant stiffness. In alternative or additional embodiments, the core shaft 26 may be divided into a larger number of sections.

The core shaft 26 is mounted using a bearing 26c—the bearing 26c is the first bearing on the core shaft 26 axially downstream of the gearbox 30. In the embodiment being described, the bearing 26c is on the second section 26b of the core shaft 26—in other embodiments, it may be on a different, or on the only, shaft section.

The stiffnesses of the gearbox input shaft 26a are measured holding the bearing 26c rigid, and taking the connection of the bearing 26c to the rest of the core shaft 26 as rigid, such that only the stiffnesses of the first portion 26a are considered (the remainder being treated as effectively rigid). For the purpose of determining torsional stiffness, the gearbox input shaft 26a is considered to be free at the end to which the applied torque T is applied.

Gearbox Input Shaft Radial Bending Stiffness

As shown in FIGS. 1 and 2, the core shaft 26 extends between the driver gear (the sun gear 28) and the low pressure turbine 19. The low pressure turbine 19 drives rotation of the gearbox input shaft 26.

In the arrangement being described with respect to these figures, the gearbox input shaft 26a is designed to have a relatively low radial bending stiffness to provide a "soft" mounting for the sun gear 28. The sun gear 28 may therefore move radially/perpendicularly to the engine axis 9 in response to forces on the sun gear 28, which may improve load distribution between the planet gears 32. In particular, flexibility in the mounting may improve load distribution as the contact regions between gears define constant force angles, and hence those contact regions with larger magnitude forces produce a net force away from their contact positions, which may in turn reduce the larger forces, making them nearer to the mean. Such a soft mounting of the sun gear 28 may be designed to accommodate movements to address one or more of carrier bearing location accuracy and clearance, planet and/or sun gear teeth spacing and thickness variation/manufacturing tolerances, and/or gearbox input shaft mainline bearing location accuracy and clearance, or the likes.

The diagonally lined box 402 at the bearing 26c of the core shaft 26 is shown (in FIG. 8) to indicate the connection to the bearing 26c being treated as rigid (as for a cantilever beam mounting).

Figure 8:
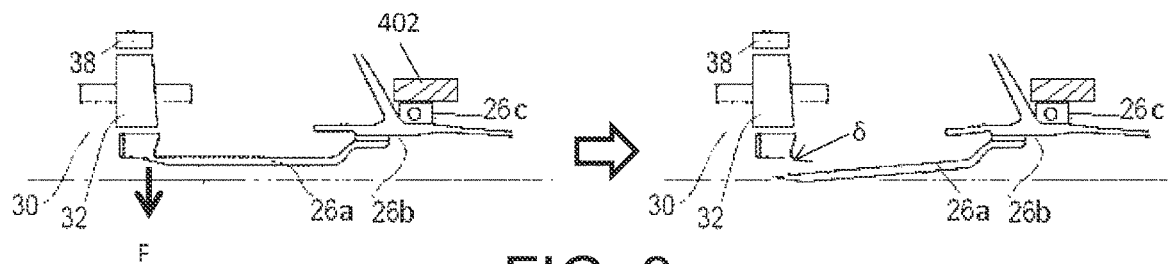
FIG. 8 illustrates radial bending of the gearbox input shaft shown in FIG. 7.

In the embodiment being described, the gearbox input shaft radial bending stiffness is determined treating the portion 26a of the core shaft 26 forward of the bearing 26c (i.e. the gearbox input shaft 26a of the described arrangement) as a free-body fixedly mounted at the point of connection to the bearing 26c, with a force applied at the axial position of the axial centre point of the sun gear 28. This is illustrated in FIG. 8, with arrow F indicating the (radial) force on the gearbox input shaft 26a and 6 illustrating the (radial) displacement of the end of the shaft 26a. The force, F, is shown acting along a line that passes through the engine axis 9—the skilled person would appreciate that a force towards the engine axis 9 on one side of the axis 9 is a force away from the engine axis on the other side of the axis 9, such that the stiffness takes into account bending both towards and away from the axis. The gearbox 30 is shown for reference, but the sun gear 28 is not shown as moving with the shaft 26a as the stiffness is calculated as a free body stiffness, as mentioned above.

In various embodiments, the gearbox input shaft radial bending stiffness may be greater than or equal to $6 \times 10^5$ N/m (i.e. 600 kN/m), and optionally greater than or equal to $8.0 \times 10^5$ N/m. In some embodiments, for example in embodiments in which the fan diameter is in the range from 240 to 280 cm, the gearbox input shaft radial bending stiffness may be greater than or equal to $6.0 \times 10^5$ N/m or $9.0 \times 10^5$ N/m. In some embodiments, for example in embodiments in which the fan diameter is in the range from 330 to 380 cm, the gearbox input shaft radial bending stiffness may be greater than or equal to $8.0 \times 10^5$ N/m or $1.2 \times 10^6$ N/m In various embodiments, the gearbox input shaft radial bending stiffness may be in the range from $6 \times 10^5$ to $3 \times 10^7$ N/m (i.e. 600 kN/m to 30,000 kN/m), and optionally in the range from $8.0 \times 10^5$ to $1.8 \times 10^7$ N/m. In some embodiments, for example in embodiments in which the fan diameter is in the range from 240 to 280 cm, the gearbox input shaft radial bending stiffness may be in the range from $6.0 \times 10^5$ to $1.8 \times 10^7$ N/m and optionally in the range from $8.5 \times 10^5$ to $9.9 \times 10^5$ N/m (and may be equal to $9.1 \times 10^5$ N/m). In some embodiments, for example in embodiments in which the fan diameter is in the range from 330 to 380 cm, the gearbox input shaft radial bending stiffness may be in the range from $8.0 \times 10^5$ to $3.0 \times 10^7$ N/m, and optionally in the range from $9.5 \times 10^5$ to $2.2 \times 10^6$ N/m (and may be equal to $1.3 \times 10^6$ N/m).

The radial bending stiffness of the gearbox input shaft may be adjusted to lie within this range by selecting or modifying one or more of shaft materials, diameter, wall thickness, or the likes.

Gearbox Input Shaft Tilt Stiffness

Figure 9:
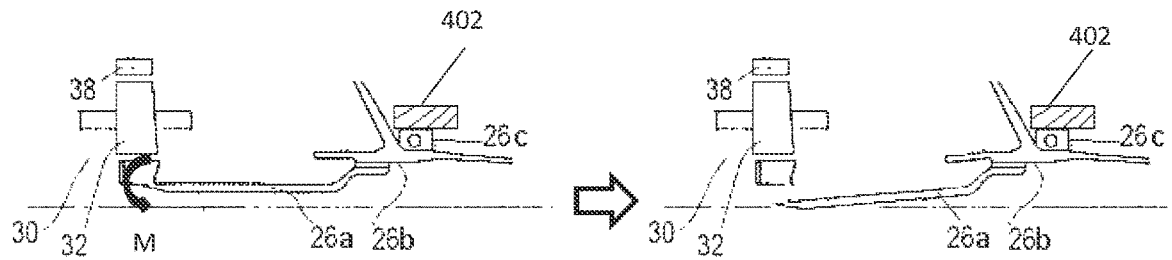
FIG. 9 illustrates tilt stiffness of the gearbox input shaft shown in FIG. 7.
Figure 10:
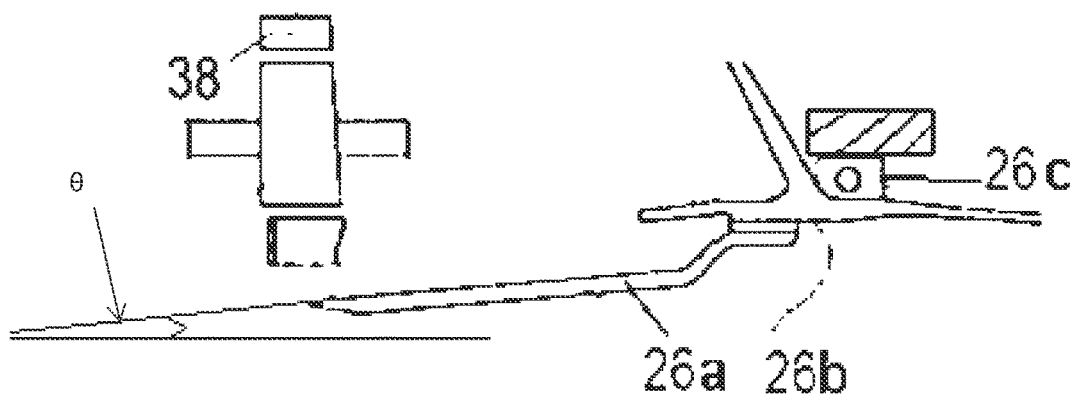
FIG. 10 illustrates tilt stiffness of the gearbox input shaft as shown in FIGS. 7 and 9.

Gearbox input shaft tilt stiffness is a measure of the resistance of the gearbox input shaft 26a to an applied moment, M, as illustrated in FIGS. 9 and 10. The axis of the moment is perpendicular to the engine axis 9. Two points of the input shaft 26 are selected for measuring tilt stiffness: a forward point at the axial position of the axial centre point of the sun gear 28 (where the moment is applied) and a rearward point at the axial position of the connection to the bearing 26c (treated as rigid).

The skilled person would appreciate that FIGS. 8 and 9 are schematic only—the curvature of the shaft 26a would differ between the application of a force (FIG. 8) and the application of a moment (FIG. 9) as described above.

In response to the applied moment, M, which is an anticlockwise moment in the example shown, but could be a clockwise moment in other examples, the gearbox input shaft 26a bends through an angle θ—the angle θ is constant at each point along its length for a shaft 26 having a constant section, but may vary with length for shafts 26 with non-constant sections, such as that shown in FIG. 9. For ease of depiction, FIG. 9 shows deformation occurring on the narrower part of the shaft 26 only. More generally, contributions to tilt stiffness from different portions of a shaft 26 of varying width may be combined to determine an overall stiffness.

The curvature at the point of interest—the forward point at the axial position of the axial centre point of the sun gear 28—is selected for measurement of the angle θ. θ is measured between a line parallel to the engine axis 9 and the local tangent to the gearbox input shaft 26a at the forward point. This is shown in FIG. 10, noting that the tangent appears parallel to the length of the shaft 26 in this representation as the curvature is not shown. FIG. 5 illustrates the determination of the tangent and theta more clearly.

In various embodiments, the gearbox input shaft tilt stiffness may be greater than or equal to $5 \times 10^4$ Nm/radian, and optionally greater than or equal to $6.5 \times 10^4$ Nm/radian. In some embodiments, for example in embodiments in which the fan diameter is in the range from 240 to 280 cm, the gearbox input shaft tilt stiffness may be greater than or equal to $5 \times 10^4$ Nm/radian or $8 \times 10^4$ Nm/radian. In some embodiments, for example in embodiments in which the fan diameter is in the range from 330 to 380 cm, the gearbox input shaft tilt stiffness may be greater than or equal to $1.0 \times 10^5$ Nm/radian or $2.4 \times 10^5$ Nm/radian.

In various embodiments, the gearbox input shaft tilt stiffness may be in the range $5 \times 10^4$ to $5 \times 10^6$ Nm/radian, and optionally in the range $6.5 \times 10^4$ to $2.6 \times 10^6$ Nm/radian. In some embodiments, for example in embodiments in which the fan diameter is in the range from 240 to 280 cm, the gearbox input shaft tilt stiffness may be in the range from $5 \times 10^4$ to $8 \times 10^5$ Nm/radian and optionally $8 \times 10^4$ to $9 \times 10^4$ Nm/radian (and may be equal to $8.6 \times 10^4$ Nm/radian). In some embodiments, for example in embodiments in which the fan diameter is in the range from 330 to 380 cm, the gearbox input shaft tilt stiffness may be in the range from $1.0 \times 10^5$ to $5.0 \times 10^6$ Nm/radian, and optionally $2.2 \times 10^5$ to $3.2 \times 10^5$ Nm/radian (and may be equal to $2.6 \times 10^5$ Nm/radian).

The tilt stiffness of the gearbox input shaft 26a may be adjusted to lie within this range by selecting or modifying one or more of shaft materials, diameter, wall thickness, or the likes.

Gearbox Input Shaft Torsional Stiffness

Figure 11:
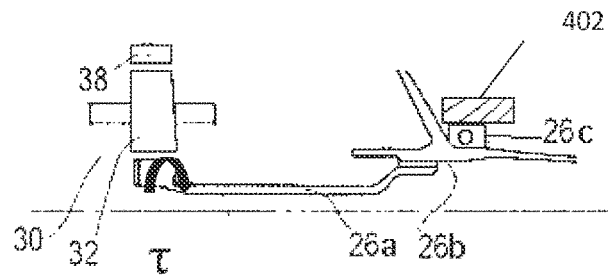
FIG. 11 illustrates torsional stiffness of the gearbox input shaft shown in FIG. 7.

Gearbox input shaft torsional stiffness is a measure of the resistance of the shaft 26a to an applied torque, τ, as illustrated in FIG. 11. It may be described as resistance to twisting, or winding, of the gearbox input shaft 26a. The axis of the moment is parallel to the engine axis 9. The diagonally lined box 402 at the location of the bearing 26c of the gearbox input shaft 26 is shown to indicate the connection to the bearing 26c being treated as rigid and non-rotating (as for a cantilever beam mounting). The gearbox input shaft 26a is otherwise treated as a free body (the sun gear-planet gear mesh stiffness is not included).

A torque, τ, is applied to the gearbox input shaft 26a (at the forward position—the position of the axial mid-point of the sun gear 28) and causes a rotational deformation, θ (e.g. twist) along the length of the shaft 26a. θ is measured at the position of application of the torque. As described above, the core shaft 26 is held to be non-rotating at the location of the bearing 26c, such that the value of the twist increases from zero to θ along the length of the first shaft portion 26a (the gearbox input shaft 26a).

The angle through which a point on the shaft circumference at the forward position moves is θ, where θ is the angle measured in radians. An effective linear torsional stiffness can therefore be defined for the gearbox input shaft 26a as described above, using the radius r of the gearbox input shaft 26a. In embodiments in which the gearbox input shaft 26a varies in radius, the radius of the gearbox input shaft 26a at the interface to the sun gear 28 may be used as the radius r (i.e. the radius at the forward end of the shaft for the embodiment shown). For the purpose of determining torsional stiffness, the gearbox input shaft 26a is considered to be free at the end to which the applied torque τ is applied.

In the arrangement shown, the position of the axial mid-point of the sun gear 28 is also at or adjacent the forward end of the shaft 26a. In alternative embodiments, the gearbox input shaft 26a may extend further forward of the sun gear 28; the forward position used for the application of the torque, force or moment is still taken to be the position of the axial mid-point of the sun gear 28 in such embodiments.

In various embodiments, the torsional stiffness of the gearbox input shaft 26a is greater than or equal to $1.4 \times 10^6$ Nm/radian, and optionally greater than or equal to $1.6 \times 10^6$ Nm/radian. In some embodiments, for example in embodiments in which the fan diameter is in the range from 240 to 280 cm, the torsional stiffness of the gearbox input shaft may be greater than or equal to $1.4 \times 10^6$ Nm/radian or $1.8 \times 10^6$ Nm/radian. In some embodiments, for example in embodiments in which the fan diameter is in the range from 330 to 380 cm, the torsional stiffness of the gearbox input shaft may be greater than or equal to $3 \times 10^6$ Nm/radian or $5 \times 10^6$ Nm/radian.

In various embodiments, the torsional stiffness of the gearbox input shaft 26a is in the range from $1.4 \times 10^6$ to $2.5 \times 10^8$ Nm/radian, and optionally in the range from $1.6 \times 10^6$ to $2.5 \times 10^7$ Nm/radian. In some embodiments, for example in embodiments in which the fan diameter is in the range from 240 to 280 cm, the torsional stiffness of the gearbox input shaft may be in the range from $1.4 \times 10^6$ to $2.0 \times 10^7$ Nm/radian, and optionally may be in the range from $1.8 \times 10^6$ to $3 \times 10^6$ Nm/radian (and optionally may be equal to $2.0 \times 10^6$ Nm/radian). In some embodiments, for example in embodiments in which the fan diameter is in the range from 330 to 380 cm, the torsional stiffness of the gearbox input shaft may be in the range from $3 \times 10^6$ to $1 \times 10^8$ Nm/radian and optionally may be in the range from $5 \times 10^6$ to $6 \times 10^6$ Nm/radian (and optionally may be equal to $5.7 \times 10^6$ Nm/radian).

In various embodiments, the effective linear torsional stiffness of the gearbox input shaft 26a is greater than or equal to $4.0 \times 10^8$ N/m, and optionally greater than or equal to $4.3 \times 10^8$ N/m. In some embodiments, for example in embodiments in which the fan diameter is in the range from 240 to 280 cm, the effective linear torsional stiffness of the gearbox input shaft may be greater than or equal to $4.0 \times 10^8$ N/m or $4.4 \times 10^8$ N/m. In some embodiments, for example in embodiments in which the fan diameter is in the range from 330 to 380 cm, effective linear torsional stiffness of the gearbox input shaft may be greater than or equal to $4.3 \times 10^8$ N/m or $6.8 \times 10^8$ N/m.

In various embodiments, the effective linear torsional stiffness of the gearbox input shaft is in the range $4.0 \times 10^8$ to $3.0 \times 10^{10}$ N/m, and optionally in the range from $4.3 \times 10^8$ to 9.0×10⁹ N/m. In some embodiments, for example in embodiments in which the fan diameter is in the range from 240 to 280 cm, the effective linear torsional stiffness of the gearbox input shaft may be in the range from $4.0 \times 10^8$ to $1.5 \times 10^{10}$ N/m, and optionally may be in the range from $4.4 \times 10^8$ to $5.4 \times 10^8$ N/m (and optionally may be equal to $4.9 \times 10^8$ N/m, and optionally $4.92 \times 10^8$ N/m). In some embodiments, for example in embodiments in which the fan diameter is in the range from 330 to 380 cm, the effective linear torsional stiffness of the gearbox input shaft may be in the range from $4.3 \times 10^8$ to $3.0 \times 10^{10}$ N/m and optionally may be in the range from $5.0 \times 10^8$ to $8.0 \times 10^8$ N/m (and optionally may be equal to $6.8 \times 10^8$ N/m, and optionally $6.84 \times 10^8$ N/m).

The torsional stiffness of the gearbox input shaft 26a may be adjusted to lie within this range by selecting or modifying one or more of shaft materials, diameter, wall thickness, or the likes.

Torque on the Core Shaft

Figure 12:
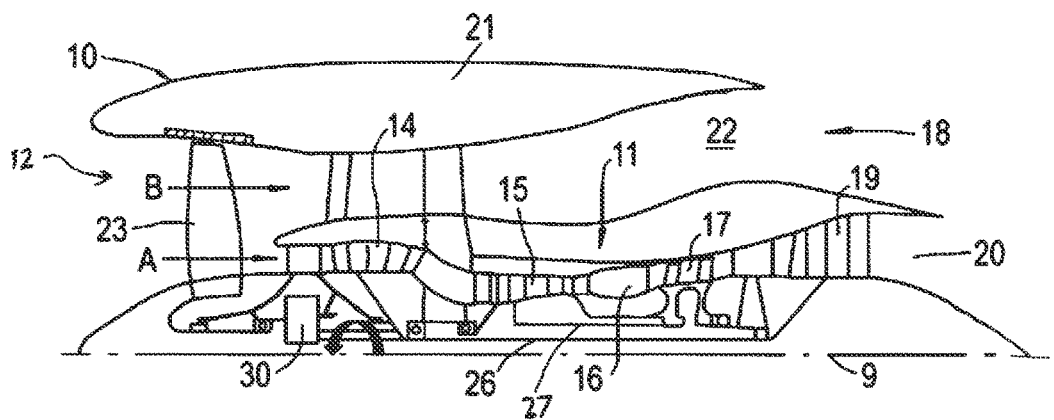
FIG. 12 is a sectional side view of the engine illustrating the application of a torque to the gearbox input shaft.

At cruise conditions, a torque, $\tau$, is applied to the core shaft 26 by the rotation of the turbine 19, as illustrated in FIG. 12. As torque does not vary with shaft radius for a rotating shaft, the torque is constant along the core shaft 26 even if the radius varies between the gearbox input shaft portion 26a and the turbine shaft portion 26b.

The torque supplied by the turbine 19 to the core shaft (i.e. the torque on the core shaft) at cruise conditions may be greater than or equal to 10,000 Nm, and optionally greater than or equal to 11,000 Nm. In some embodiments, for example in embodiments in which the fan diameter is in the range from 240 to 280 cm, the torque on the core shaft 26 at cruise conditions may be greater than or equal to 10,000 Nm or 11,000 Nm (and optionally may be equal to 12,750 Nm). In some embodiments, for example in embodiments in which the fan diameter is in the range from 330 to 380 cm, the torque on the core shaft 26 at cruise conditions may be greater than or equal to 25,000 Nm, and optionally greater than or equal to 30,000 Nm (and optionally may be equal to 34,000 Nm).

The torque on the core shaft at cruise conditions may be in the range from 10,000 to 50,000 Nm, and optionally from 11,000 to 45,000 Nm. In some embodiments, for example in embodiments in which the fan diameter is in the range from 240 to 280 cm, the torque on the core shaft 26 at cruise conditions may be in the range from 10,000 to 15,000 Nm, and optionally from 11,000 to 14,000 Nm (and optionally may be equal to 12,750 Nm). In some embodiments, for example in embodiments in which the fan diameter is in the range from 330 to 380 cm, the torque on the core shaft 26 at cruise conditions may be in the range from 25,000 Nm or 50,000 Nm, and optionally from 30,000 to 40,000 Nm (and optionally may be equal to 34,000 Nm).

Under maximum take-off (MTO) conditions, the torque on the core shaft 26 may be greater than or equal to 28,000 Nm, and optionally greater than or equal to 30,000 Nm. In some embodiments, for example in embodiments in which the fan diameter is in the range from 240 to 280 cm, the torque on the core shaft 26 under MTO conditions may be greater than or equal to 28,000 Nm, and optionally greater than or equal to 35,000 Nm (and optionally may be equal to 36,300 Nm). In some embodiments, for example in embodiments in which the fan diameter is in the range from 330 to 380 cm, the torque on the core shaft 26 under MTO conditions may greater than or equal to 70,000 Nm, and optionally greater than or equal to 80,000 or 82,000 Nm (and optionally may be equal to 87,100 Nm).

Under maximum take-off (MTO) conditions, the torque on the core shaft 26 may be in the range from 28,000 Nm to 135,000 Nm, and optionally in the range from 30,000 to 110,000 Nm. In some embodiments, for example in embodiments in which the fan diameter is in the range from 240 to 280 cm, the torque on the core shaft 26 under MTO conditions may be in the range from 28,000 to 50,000 Nm, and optionally from 35,000 to 38,000 Nm (and optionally may be equal to 36,000 Nm). In some embodiments, for example in embodiments in which the fan diameter is in the range from 330 to 380 cm, the torque on the core shaft 26 under MTO conditions may be in the range from 70,000 Nm or 135,000 Nm, and optionally from 80,000 to 90,000 Nm or 82,000 to 92,000 Nm (and optionally may be equal to 87,000 Nm).

In the embodiments being described, the torque on the core shaft 26 is greater than or equal to 10,000 Nm under cruise conditions, and optionally below 50,000 Nm at cruise conditions.

The inventor has discovered that particular ratios of the parameters defined above have significant impact on gearbox performance. In particular, one, some or all of the below conditions may apply to any embodiment:

A first sun input shaft ratio can be defined (at cruise conditions), as:

$$\frac{\text{the tilt stiffness of the gearbox input shaft } (26) \left[\frac{Nm}{\text{rad}}\right]}{\text{the torque on the core shaft } (26) \ [Nm]}$$

In various embodiments, the first sun input shaft ratio may be greater than or equal to 4 rad⁻¹, and optionally greater than or equal to 5.0 rad⁻¹. In some embodiments, for example in embodiments in which the fan diameter is in the range from 240 to 280 cm, the first sun input shaft ratio may be greater than or equal to 4.0 rad⁻¹, and optionally greater than or equal to 5 rad⁻¹, further optionally greater than or equal to 6 rad⁻¹ (and optionally may be equal to 6.7 rad⁻¹). In some embodiments, for example in embodiments in which the fan diameter is in the range from 330 to 380 cm, first sun input shaft ratio may be greater than or equal to 4.0 rad⁻¹, and optionally greater than or equal to 6 rad⁻¹ or 7 rad⁻¹ (and optionally may be equal to 7.6 rad⁻¹).

In various embodiments, the first sun input shaft ratio may be in the range from 4 to 150 rad⁻¹, and optionally in the range from 5.0 to 90 rad⁻¹. In some embodiments, for example in embodiments in which the fan diameter is in the range from 240 to 280 cm, the first sun input shaft ratio may be in the range from 4.0 to 90 rad⁻¹, and optionally from 5 to 50 rad⁻¹, further optionally from 5 to 8 rad⁻¹ (and optionally may be equal to 6.7 rad⁻¹). In some embodiments, for example in embodiments in which the fan diameter is in the range from 330 to 380 cm, the first sun input shaft ratio may be in the range from 4.0 to 90 rad⁻¹, and optionally from 6 to 50 rad⁻¹ or 6 to 9 rad⁻¹ (and optionally may be equal to 7.6 rad⁻¹).

In various embodiments, a product of the components of the first sun input shaft ratio, i.e. the tilt stiffness of the gearbox input shaft (26) multiplied by the torque on the core shaft (26), may also be calculated. The value of this product, in various embodiments, may be equal to or greater than $5.5 \times 10^8$ N² m⁻²/radian, and optionally less than $2.0 \times 10^{11}$ N² m⁻²/radian. Optionally, the product may be greater than or equal to $6.0 \times 10^8$ N² m⁻² rad⁻¹, and further optionally may be less than $9.0 \times 10^{10}$ N² m⁻² rad⁻¹. In some embodiments, for example in embodiments in which the fan diameter is in the range from 240 to 280 cm, the product value may be greater than or equal to $5.5\times10^8$ $N^2$ $m^{-2}$ $rad^{-1}$, and optionally less than to $3.0\times10^{10}$ $N^2$ $m^{-2}$ $rad^{-1}$. In some embodiments, for example in embodiments in which the fan diameter is in the range from 330 to 380 cm, the product value may be greater than or equal to $1.0\times10^9$ $N^2$ $m^{-2}$ $rad^{-1}$, and optionally less than to $2.0\times10^{11}$ $N^2$ $m^{-2}$ $rad^{-1}$.

Alternatively or additionally, a second sun input shaft ratio can be defined (at cruise conditions), as:

$$\frac{\text{the radial bending stiffness of the gearbox input shaft (26)}[N/m]}{\text{the torque on the core shaft (26)}[Nm]}$$

In various embodiments, the second sun input shaft ratio may be greater than or equal to 7 $m^{-2}$ and optionally greater than or equal to 14 $m^{-2}$, and further optionally greater than or equal to 35 $m^2$. In some embodiments, for example in embodiments in which the fan diameter is in the range from 240 to 280 cm, the second sun input shaft ratio may be greater than or equal to 7 $m^{-2}$ or 14 $m^{-2}$, and optionally greater than or equal to 50 $m^{-2}$, further optionally greater than or equal to 65 $m^{-2}$ (and optionally may be equal to 71 $m^{-2}$). In some embodiments, for example in embodiments in which the fan diameter is in the range from 330 to 380 cm, the second sun input shaft ratio may be greater than or equal to 7 $m^{-2}$, and optionally greater than or equal to 35 $m^{-2}$ (and optionally may be equal to 38 $m^{-2}$).

In various embodiments, the second sun input shaft ratio may be in the range from 7 to 800 $m^{-2}$, and optionally in the range from 14 to 400 $m^{-2}$, and further optionally in the range from 14 to 100 $m^{-2}$. In some embodiments, for example in embodiments in which the fan diameter is in the range from 240 to 280 cm, the second sun input shaft ratio may be in the range from 7 or 14 to 400 $m^{-2}$, and optionally from 50 to 100 $m^{-2}$, further optionally from 65 to 75 $m^{-2}$ (and optionally may be equal to 71 $m^{-2}$). In some embodiments, for example in embodiments in which the fan diameter is in the range from 330 to 380 cm, the second sun input shaft ratio may be in the range from 7 to 400 $m^{-2}$, optionally 7 to 70 $m^{-2}$, and optionally from 35 to 45 m (and optionally may be equal to 38 $m^{-2}$).

In various embodiments, a product of the components of the second sun input shaft ratio, i.e. the radial bending stiffness of the gearbox input shaft (26) multiplied by the torque on the core shaft (26), may also be calculated. The value of this product, in various embodiments, may be greater than or equal to $1.2\times10^9$ $N^2$, and optionally less than $8.0\times10^{11}$ $N^2$. In various embodiments, the value may be greater than or equal to $2.4\times10^9$ $N^2$, and optionally less than $4.0\times10^{11}$ $N^2$ Optionally, the product may be greater than or equal to $7.0\times10^9$ $N^2$, and optionally less than $2.0\times10^{11}$ $N^2$. In some embodiments, for example in embodiments in which the fan diameter is in the range from 330 to 380 cm, the product may be greater than or equal to $4.4\times10^9$ $N^2$, and optionally less than $8.0\times10^{11}$ $N^2$, or greater than or equal to $8.0\times10^9$ $N^2$, and optionally less than $8.0\times10^{11}$ $N^2$.

Figure 13:
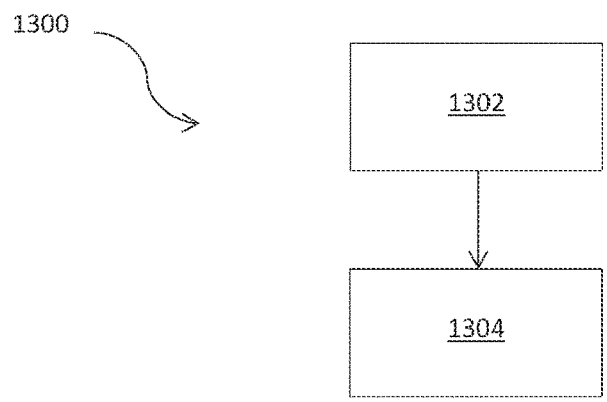
FIG. 13 illustrates methods of various embodiments.

The present disclosure also relates to methods 1300 of operating a gas turbine engine 10 on an aircraft 50. The methods 1300 are illustrated in FIG. 13. The method 1300 comprises starting up and operating 1302 the engine 10 (e.g taxiing on a runway, take-off, and climb of the aircraft 50, as suitable) to reach cruise conditions. Once cruise conditions have been reached, the method 1300 then comprises operating 1304 the gas turbine engine 10, which may be as described in one or more embodiments elsewhere herein, to provide propulsion under cruise conditions. The gas turbine engine 10 is operated such that any or all of the parameters or ratios defined herein are within the specified ranges. For example, the method comprises operating 1304 the gas turbine engine 10 such that any one or more of:
  (i) the torque on the core shaft (26) under cruise conditions is greater than 10,000 Nm, and optionally below 50,000 Nm; and/or
  (ii) the first sun input shaft ratio of:

$$\frac{\text{the tilt stiffness of the gearbox input shaft (26)}\left[\frac{Nm}{rad}\right]}{\text{the torque on the core shaft (26) }[Nm]}$$

is greater than or equal to 4 $rad^{-1}$, and optionally less than 150 $rad^{-1}$, under cruise conditions (the first sun input shaft ratio may fall within any of the ranges as detailed above); and/or
  (iii) the second sun input shaft ratio of:

$$\frac{\text{the radial bending stiffness of the gearbox input shaft (26)}[N/m]}{\text{the torque on the core shaft (26)}[Nm]}$$

is greater than or equal to 7 $m^{-2}$, and optionally less than 800 $m^{-2}$, under cruise conditions (the second sun input shaft ratio may fall within any of the ranges as detailed above); and/or
  (iv) a first sun input shaft product of:
    the tilt stiffness of the gearbox input shaft×the torque on the core shaft is greater than or equal to $5.5\times10^8$ $N^2$ $m^2$ $rad^{-1}$, and optionally less than $2.0\times10^{11}$ $N^2$ $m^2$ $rad^{-1}$; and/or
  (v) a second sun input shaft product of:
    the radial bending stiffness of the gearbox input shaft× the torque on the core shaft is greater than or equal to $1.2\times10^9$ $N^2$, and optionally less than $8.0\times10^{11}$ $N^2$.

Figure 14:
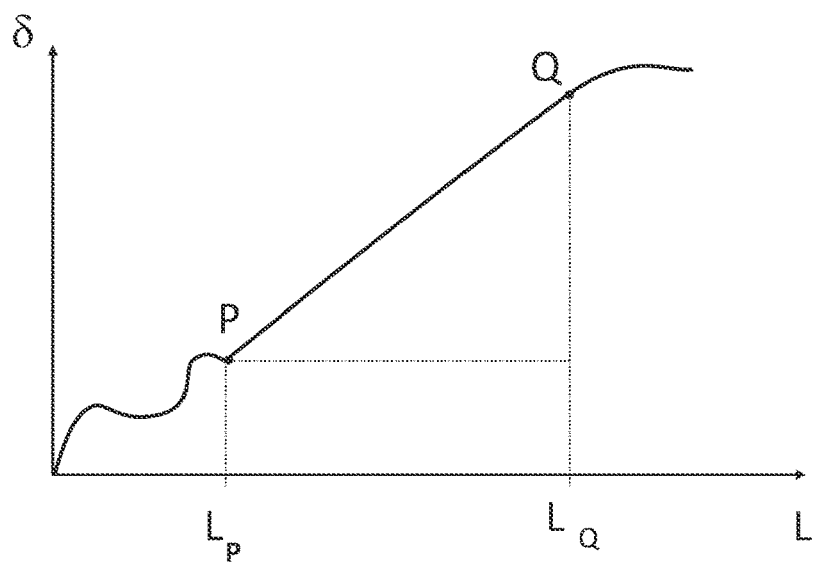
FIG. 14 is a graph of displacement against load, illustrating an elastic region within which stiffnesses of components may be determined.
Figure 15:
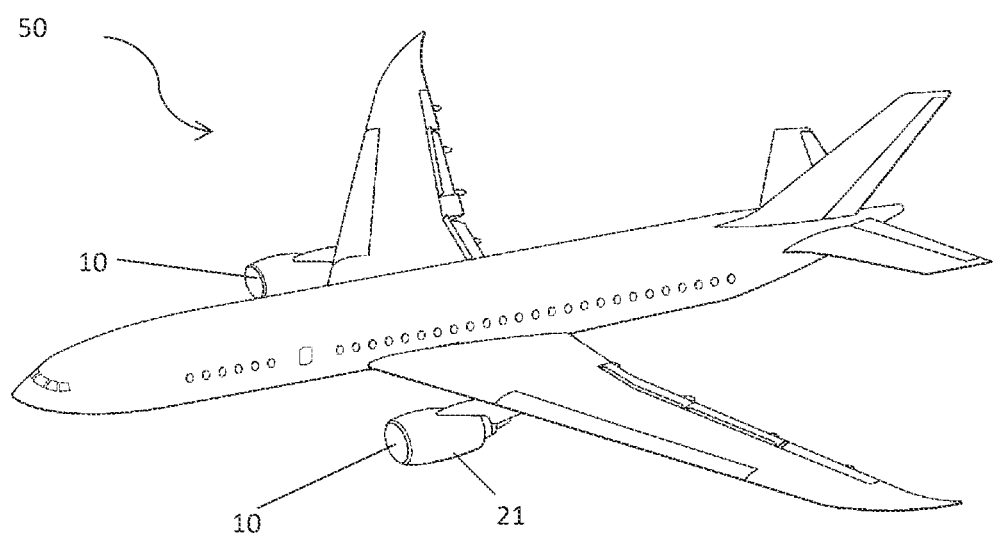
FIG. 15 shows an aircraft with two engines as described herein.

FIG. 14 illustrates how the stiffnesses defined herein may be measured. FIG. 14 shows a plot of the displacement 6 resulting from the application of a load L (e.g. a force, moment or torque) applied to a component for which the stiffness is being measured. At levels of load from zero to $L_P$ there is a non-linear region in which displacement is caused by motion of the component (or relative motion of separate parts of the component) as it is loaded, rather than deformation of the component; for example moving within clearance between parts. At levels of load above $L_Q$ the elastic limit of the component has been exceeded and the applied load no longer causes elastic deformation—plastic deformation or failure of the component may occur instead. Between points P and Q the applied load and resulting displacement have a linear relationship. The stiffnesses defined herein may be determined by measuring the gradient of the linear region between points P and Q (with the stiffness being the inverse of that gradient). The gradient may be found for as large a region of the linear region as possible to increase the accuracy of the measurement by providing a larger displacement to measure. For example, the gradient may be found by applying a load equal to or just greater than $L_P$ and equal to or just less than $L_Q$. Values for $L_P$ and $L_Q$ may be estimated prior to testing based on materials characteristics so as to apply suitable loads. Although the displacement is referred to as δ in this description, the skilled person would appreciate that equivalent principles would apply to a linear or angular displacement.

The stiffnesses defined herein, unless otherwise stated, are for the corresponding component(s) when the engine is off (i.e. at zero speed/on the bench). The stiffnesses generally do not vary significantly over the operating range of the engine; the stiffness at cruise conditions of the aircraft to which the engine is attached (those cruise conditions being as defined elsewhere herein) may therefore be the same as for when the engine is not in use. However, where the stiffness varies over the operating range of the engine, the stiffnesses defined herein are to be understood as being values for when the engine is at room temperature and unmoving.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades; and
a gearbox that receives input from a gearbox input shaft portion of the core shaft and drives the fan via a fan shaft at a lower rotational speed than the core shaft, the gearbox being an epicyclic gearbox comprising (i) a sun gear that receives the input from the core shaft, (ii) a plurality of planet gears, (iii) a ring gear, and (iv) a planet carrier arranged to have the plurality of planet gears mounted thereon,
wherein, at cruise conditions:
a product of tilt stiffness of the gearbox input shaft portion and torque on the core shaft is equal to or greater than $5.5 \times 10^8$ $N^2$ $m^2$/radian and less than $2.0 \times 10^{11}$ $N^2$ $m^2$/radian;
wherein the tilt stiffness is determined (i) by treating the gearbox input shaft portion as being a free body at a forward point of the gearbox input shaft portion at which is applied a moment whose axis is perpendicular to an axis of the gas turbine engine and (ii) by considering a connection between a rearward end of the gearbox input shaft portion and a remainder of the core shaft to be rigid; and
wherein the tilt stiffness is determined based on an angle measured between (i) a line parallel to the axis of the gas turbine engine and (ii) a local tangent to the gearbox input shaft portion at the forward point of the shaft portion at which the moment is applied.

2. The gas turbine engine of claim 1, wherein the product of the tilt stiffness of the gearbox input shaft portion and the torque on the core shaft is equal to or greater than $6.0 \times 10^8$ $N^2$ $m^2$/radian.

3. The gas turbine engine of claim 1, wherein the product of the tilt stiffness of the gearbox input shaft portion and the torque on the core shaft is less than $9.0 \times 10^{10}$ $N^2$ $m^2$/radian.

4. The gas turbine engine of claim 1,
wherein:
(i) the tilt stiffness of the gearbox input shaft portion is greater than or equal to $5 \times 10^4$ Nm/radian and is less than or equal to $5 \times 10^6$ Nm/radian; and/or
(ii) radial bending stiffness of the gearbox input shaft portion is greater than or equal to $6 \times 10^5$ N/m and is less than or equal to $3 \times 10^7$ N/m;
wherein the radial bending stiffness is determined (i) by treating the gearbox input shaft portion as being a free body at the forward point of the shaft portion at which is applied a force perpendicular to the axis of the gas turbine engine and (ii) by considering the connection between the rearward end of the gearbox input shaft portion and the remainder of the core shaft to be rigid; and
wherein the radial bending stiffness is determined based on a displacement of the forward point that is measured perpendicular to the axis of the gas turbine engine along a line of action of the applied force.

5. The gas turbine engine of claim 1, wherein:
the torque on the core shaft at cruise conditions is in a range from 10,000 Nm to 15,000 Nm; and/or
a diameter of the fan is in a range from 220 cm to 280 cm.

6. The gas turbine engine of claim 1, wherein:
the torque on the core shaft at cruise conditions is in a range from 25,000 Nm to 40,000 Nm; and/or
a diameter of the fan is in a range from 330 cm to 380 cm.

7. The gas turbine engine of claim 1,
wherein, at cruise conditions:
a product of radial bending stiffness of the gearbox input shaft portion and the torque on the core shaft is equal to or greater than $1.2 \times 10^9$ $N^2$ and less than $8.0 \times 10^{11}$ $N^2$;
wherein the radial bending stiffness is determined (i) by treating the gearbox input shaft portion as being a free body at a forward point of the gearbox input shaft portion at which is applied a force perpendicular to the axis of the gas turbine engine and (ii) by considering a connection between a rearward end of the gearbox input shaft portion and a remainder of the core shaft to be rigid; and
wherein the radial bending stiffness is determined based on a displacement of the forward point that is measured perpendicular to the axis of the gas turbine engine along a line of action of the applied force.

8. The gas turbine engine of claim 1, wherein:
(i) a gear ratio of the gearbox is in a range from 3.2 to 3.7; and/or
(ii) a specific thrust of the engine at cruise conditions is in a range from 70 to 90 $NKg^{-1}s$; and/or
(iii) a bypass ratio of the engine at cruise conditions is in a range from 12.5 to 15.

9. The gas turbine engine of claim 1, wherein:
(i) a gear ratio of the gearbox is in a range from 3.2 to 3.4; and/or
(ii) a specific thrust of the engine at cruise conditions is in a range from 95 to 100 $NKg^{-1}$ s; and/or
(iii) a bypass ratio of the engine at cruise conditions is in a range from 10 to 11.5.

10. The gas turbine engine of claim 1, wherein:
a temperature of flow at an exit of a combustor at cruise conditions is in a range from 1500K to 1650K; and/or
an overall pressure ratio is in a range from 45 to 50 at cruise conditions; and/or
a fan tip loading defined as $dH/U_{tip}^2$, where dH is specific enthalpy rise across the fan and $U_{tip}$ is a translational velocity of a fan tip at a leading edge of the tip, is in a range from 0.31 to 0.35 at cruise conditions.

11. The gas turbine engine according to claim 1, wherein:
the turbine is a first turbine, the compressor is a first compressor, and the core shaft is a first core shaft;

the engine core further comprises a second turbine, a second compressor, and a second core shaft connecting the second turbine to the second compressor;

the second turbine, the second compressor, and the second core shaft are arranged to rotate at a higher rotational speed than the first core shaft; and the core shaft is mounted using at least one bearing, with an axial location of the first bearing axially downstream of the gearbox being at or around an axial location of an exit of the first compressor.

12. A gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades; and a gearbox that receives input from a gearbox input shaft portion of the core shaft and drives the fan via a fan shaft at a lower rotational speed than the core shaft, the gearbox being an epicyclic gearbox comprising (i) a sun gear that receives the input from the core shaft, (ii) a plurality of planet gears, (iii) a ring gear, and (iv) a planet carrier arranged to have the plurality of planet gears mounted thereon, wherein, at cruise conditions:

a product of radial bending stiffness of the gearbox input shaft portion and torque on the core shaft is equal to or greater than $1.2 \times 10^9$ $N^2$ and less than $8.0 \times 10^{11}$ $N^2$;

wherein the radial bending stiffness is determined (i) by treating the gearbox input shaft portion as being a free body at a forward point of the gearbox input shaft portion at which is applied a force perpendicular to an axis of the gas turbine engine and (ii) by considering a connection between a rearward end of the gearbox input shaft portion and a remainder of the core shaft to be rigid; and wherein the radial bending stiffness is determined based on a displacement of the forward point that is measured perpendicular to the axis of the gas turbine engine along a line of action of the applied force.

13. The gas turbine engine of claim 12, wherein the product of the radial bending stiffness of the gearbox input shaft portion and the torque on the core shaft is equal to or greater than $2.4 \times 10^9$ $N^2$.

14. The gas turbine engine of claim 12, wherein the product of the radial bending stiffness of the gearbox input shaft portion and the torque on the core shaft is less than $4.0 \times 10^{11}$ $N^2$.

15. The gas turbine engine of claim 12, wherein:

(i) tilt stiffness of the gearbox input shaft portion is greater than or equal to $5 \times 10^4$ Nm/radian and is less than or equal to $5 \times 10^6$ Nm/radian; and/or (ii) the radial bending stiffness of the gearbox input shaft portion is greater than or equal to $6 \times 10^5$ N/m and is less than or equal to $3 \times 10^7$ N/m;

wherein the tilt stiffness is determined (i) by treating the gearbox input shaft portion as being a free body at a forward point of the gearbox input shaft at which is applied a moment whose axis is perpendicular to the axis of the gas turbine engine and (ii) by considering a connection between the rearward end of the gearbox input shaft portion and the remainder of the core shaft to be rigid; and wherein the tilt stiffness is determined based on an angle measured between (i) a line parallel to the axis of the gas turbine engine and (ii) a local tangent to the gearbox input shaft portion at the forward point of the shaft at which the moment is applied.

16. The gas turbine engine of claim 1, wherein:

the torque on the core shaft at cruise conditions is in a range from 11,000 Nm to 14,000 Nm; and/or a diameter of the fan is in a range from 220 cm to 280 cm.

17. The gas turbine engine of claim 1, wherein:

the torque on the core shaft at cruise conditions is in a range from 25,000 Nm to 50,000 Nm; and/or a diameter of the fan is in a range 330 cm to 380 cm.

18. The gas turbine engine according to claim 1, wherein:

the turbine is a first turbine, the compressor is a first compressor, and the core shaft is a first core shaft;

the engine core further comprises a second turbine, a second compressor, and a second core shaft connecting the second turbine to the second compressor;

the second turbine, the second compressor, and the second core shaft are arranged to rotate at a higher rotational speed than the first core shaft; and the core shaft is mounted using at least two bearings, with an axial location of one bearing being at or around an axial location of an exit of the first compressor, and an axial location of another bearing being axially between the first turbine and the second turbine.

19. A method of operating an aircraft, a gas turbine engine of the aircraft comprising:

an engine core comprising a turbine, a compressor, and a core shaft connecting the turbine to the compressor;

a fan located upstream of the engine core, the fan comprising a plurality of fan blades; and a gearbox that receives input from a gearbox input shaft portion of the core shaft and drives the fan via a fan shaft at a lower rotational speed than the core shaft, the gearbox being an epicyclic gearbox comprising (i) a sun gear that receives the input from the core shaft, (ii) a plurality of planet gears, (iii) a ring gear, and (iv) a planet carrier arranged to have the plurality of planet gears mounted thereon; and the method comprising controlling the aircraft such that:

a product of radial bending stiffness of the gearbox input shaft portion and torque on the core shaft is equal to or greater than $1.2 \times 10^9$ $N^2$ and less than $8.0 \times 10^{11}$ $N^2$; and/or a product of tilt stiffness of the gearbox input shaft portion and the torque on the core shaft is equal to or greater than $5.5 \times 10^8$ $N^2$ m$^2$/radian and less than $2.0 \times 10^8$ $N^2$ m$^2$/radian, wherein:

the radial bending stiffness is determined (i) by treating the gearbox input shaft portion as being a free body at a forward point of the gearbox input shaft portion at which is applied a force perpendicular to an axis of the gas turbine engine and (ii) by considering a connection between a rearward end of the gearbox input shaft portion and a remainder of the core shaft to be rigid;

the radial bending stiffness is determined based on a displacement of the forward point that is measured perpendicular to the axis of the gas turbine engine along a line of action of the applied force;

the tilt stiffness is determined (i) by treating the gearbox input shaft portion as being a free body at a forward point of the gearbox input shaft portion at which is applied a moment whose axis is perpendicular to the axis of the gas turbine engine and (ii) by considering a connection between a rearward end of the gearbox input shaft portion and a remainder of the core shaft to be rigid; and the tilt stiffness is determined based on an angle measured between (i) a line parallel to the axis of the gas turbine engine and (ii) a local tangent to the gearbox input shaft portion at the forward point of the shaft at which the moment is applied.

20. The method of claim 19, wherein the method comprises driving the gearbox with an input torque of:
   (i) greater than or equal to 11,000 Nm and less than 50,000 Nm at cruise; and/or
   (ii) greater than or equal to 28,000 Nm and less than 135,000 Nm at maximum take-off (MTO).

* * * * *